(12) United States Patent
Protassov et al.

(10) Patent No.: US 7,974,985 B1
(45) Date of Patent: *Jul. 5, 2011

(54) SYSTEM AND METHOD FOR DUPLICATION OF VIRTUAL SERVER FILES

(75) Inventors: Stanislav S. Protassov, Moscow (RU); Alexander G. Tormasov, Moscow (RU); Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,647

(22) Filed: Jan. 16, 2011

Related U.S. Application Data

(63) Continuation of application No. 12/543,420, filed on Aug. 18, 2009, now Pat. No. 7,877,411, which is a continuation of application No. 11/378,268, filed on Mar. 20, 2006, now Pat. No. 7,584,228, which is a continuation-in-part of application No. 09/908,252, filed on Jul. 18, 2001, now Pat. No. 7,222,132.

(51) Int. Cl.
*G06F 17/30* (2006.01)

(52) U.S. Cl. ............... 707/781; 711/162
(58) Field of Classification Search .......... 707/781, 707/999.204
See application file for complete search history.

(56) References Cited

U.S. PATENT DOCUMENTS

| | | | | |
|---|---|---|---|---|
| 6,618,736 | B1 * | 9/2003 | Menage | 1/1 |
| 7,024,427 | B2 * | 4/2006 | Bobbitt et al. | 1/1 |
| 7,194,519 | B1 * | 3/2007 | Muhlestein et al. | 709/215 |
| 2007/0027957 | A1 * | 2/2007 | Peters et al. | 709/217 |

* cited by examiner

*Primary Examiner* — Charles Kim
*Assistant Examiner* — Anteneh Girma
(74) *Attorney, Agent, or Firm* — Bardmesser Law Group

(57) ABSTRACT

A method and system for managing files in a server environment includes launching a plurality of virtual servers in a computing system; copying a content of a file of a virtual server to a shared space; providing access to the file copy in the shared space when the virtual server attempts to access the file; detecting files with the same content in other virtual servers; and providing access to the file copy in the shared space from the other virtual servers when they attempt to access their files with the identical content.

15 Claims, 9 Drawing Sheets

SYSTEM AND METHOD FOR DUPLICATION OF VIRTUAL SERVER FILES

CROSS-REFERENCE TO RELATED APPLICATIONS

This application is a continuation of U.S. patent application Ser. No. 12/543,420, filed on Aug. 18, 2009, which is a continuation of U.S. patent application Ser. No. 11/378,268, filed on Mar. 20, 2006, which is a continuation-in-part of U.S. patent application Ser. No. 09/908,252, Filed: Jul. 18, 2001, entitled COMMON TEMPLATE FILE SYSTEM TREE, which are incorporated by reference herein in their entirety.

BACKGROUND OF THE INVENTION

1. Field of the Invention

This invention relates to a method and system for managing files in a server/Virtual Private Server environment, virtual environment, and, more particularly, to handling duplication of files among the Virtual Private Servers.

2. Description of the Related Art

Commercial hosting services are often provided by an Internet Service Provider (ISP), which generally provides a separate physical host computer for each customer on which to execute a server application. However, a customer purchasing hosting services will often neither require nor be amenable to paying for use of an entire host computer. In general, an individual customer will only require a fraction of the processing power, storage, and other resources of a host computer.

Accordingly, hosting multiple server applications on a single physical computer is desirable. In order to be commercially viable, however, every server application needs to be isolated from every other server application running on the same physical host. In that context, a single computer system (usually called a "host") supports multiple virtual servers (e.g., Virtual Private Servers or VPSs), sometimes as many as hundreds or thousands of VPSs.

Many applications involving such virtualization concepts as Virtual Private Servers (VPS) use VPSs in the context of webservers. Such a VPS therefore has an assigned IP address, and various other parameters associated with a webserver, for example, a URL, a DNS name, etc.

A typical situation where VPSs can be used is a single "box" (in other words, a single computer) located in a data center has a host operating system a plurality of VPSs (VPS1, VPS 2, VPS 3, etc.), each of which appears to the user as a single dedicated webserver. The user is therefore unaware that the VPS is something other than an entire "box" dedicated to that particular user.

One of the problems in modern Virtual Private Server (VPS) development is the sheer volume of the files and data required to support a typical VPS. Currently, the total volume of a disk drive partition typically allocated to each VPS is on the order of several hundred megabytes, and sometimes several gigabytes, of disk space. This does not include any user application files—it only represents the files that are required by the VPS itself to function. Disk partitions on the order of several gigabytes are rarely a problem for modern data storage, since even readily available computers (for example, in 2005) come with disk drives that are tens (or sometimes hundreds) of gigabytes. Thus, a single VPS taking up several hundred megabytes or several gigabytes out of that total amount does not present any difficulties.

However, in many cases, a single physical computer or hardware server runs not one (or even several) Virtual Private Servers, but hundreds or even thousands of such VPSs at the same time. Also, a fact of life in many such multi-VPS systems is that at any given time, only a small fraction of the Virtual Private Servers are actually doing anything, with the rest being essentially quiescent. Nonetheless, each of those even quiescent VPS still requires a full set of files, taking up a considerable amount of space on the hard drive.

Various disk space management techniques are known, such as distributing the VPS files off the local hard drive and locating them on network hard drives. However, this is not a panacea, since the VPSs' own overhead uses up network bandwidth in this case. Moreover, this does not address the problem of loading the duplicate files into RAM.

At the same time, much of the current software development methodology frequently assumes that the amount of disk space (and to a lesser extent, RAM) is essentially unlimited. Thus, many of the widely-used user applications familiar to many people, such as word processors, spreadsheets, games, etc., in the last two decades have gone from requiring a few hundred thousand kilobytes of disk space for installation to dozens of megabytes, and several megabytes of memory when running. The VPS technology is not immune to this trend, since it is generally easier to buy more storage, if necessary, than to place additional constraints on VPS product developers. In essence, having software developers spend their time and efforts on reducing the total size of the files of the VPS is not viewed as an effective way to utilize developer resources, since the issue arises primarily in the context of scalability, particularly scalability to hundreds (or thousands) of VPSs running on the same physical machine.

In sum, one of the limitations on VPS scalability is the size of the disk partition required by each VPS and the number of files that need to be loaded into physical memory. Accordingly, there is a need in the art to reduce the amount of disk space taken up by the VPS and to reduce the amount memory taken up by an individual VPS's files, so as to enable more VPSs to run on a single physical computer.

SUMMARY OF THE INVENTION

Accordingly, the present invention is related to a system and method for duplication of Virtual Private Server files that substantially obviates one or more of the disadvantages of the related art.

In one aspect of the invention, there is provided a method and system for managing files in a server environment, including launching a plurality of Virtual Private Servers (VPSs) in a computing system; copying a content of a file of a VPS to a shared space; providing access to the file copy in the shared space when the VPS attempts to access the file; detecting files with the same content in other VPSs; and providing access to the file copy in the shared space from the other VPSs when they attempt to access their files with the identical content. The files are loaded into memory space allocated to the VPS, and/or stored on a partition allocated to the VPS. Bit-wise comparison, or checksum, or hash value comparison of VPS files and master copy files in the shared space can be used in the comparing step. The replacing can be performed as a background process, or prior to launching a particular VPS. Upon a user's attempt to modify the replaced file, the corresponding link with the modified copy of the file is replaced in that VPS. The files can relate to VPS functions, or to a user application. The shared files in the master copy can include different versions of the same file.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
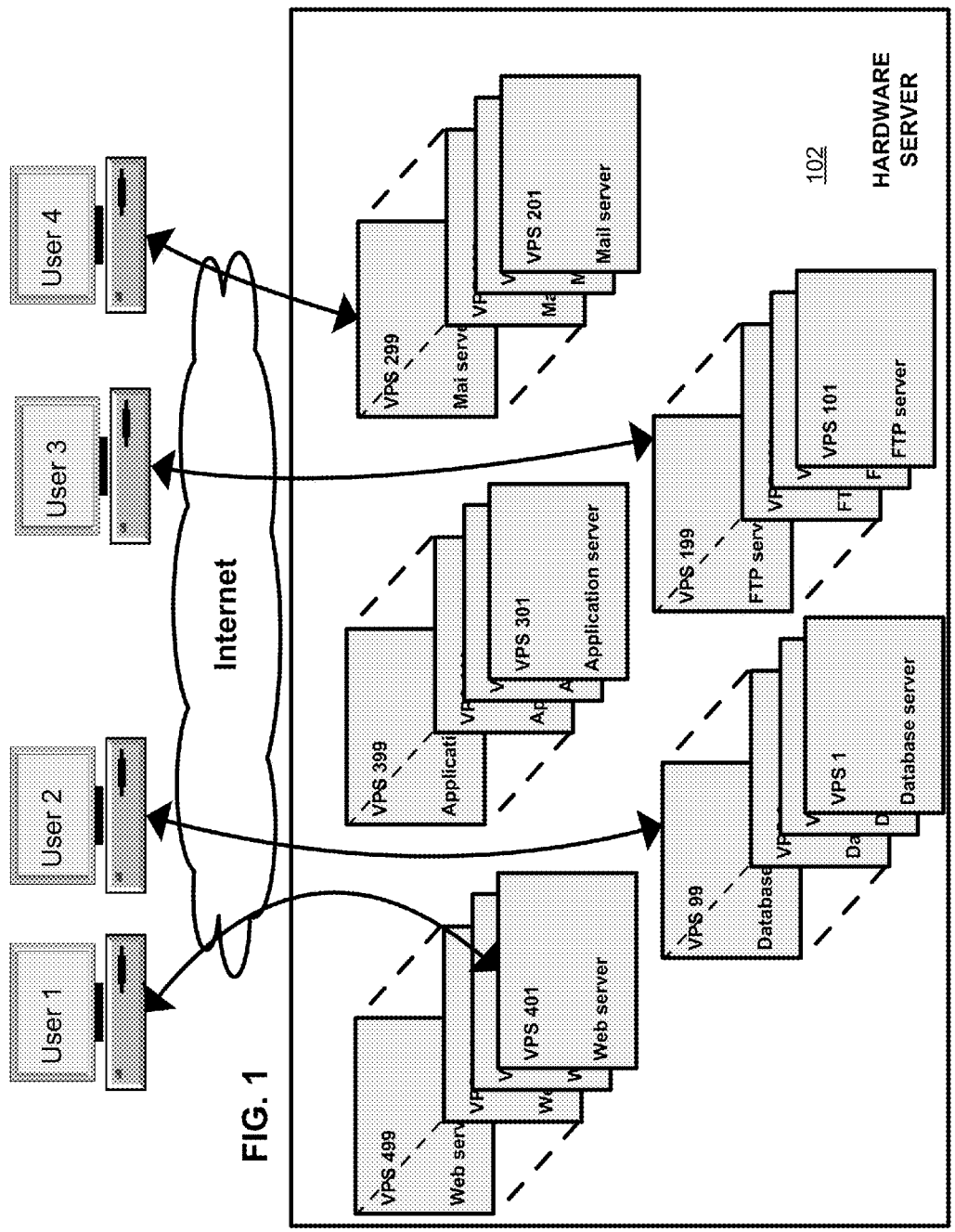
FIG. 1 illustrates using of multiple Virtual Private Servers installed in a single hardware environment and connected to multiple users or client computers.

Reference will now be made in detail to the preferred embodiments of the present invention, examples of which are illustrated in the accompanying drawings.

A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions are desirable, as if the VPS were a dedicated remote server, with the existence of the VPS being transparent from the perspective of both the VPS user and the VPS administrator.

The approach described herein is particularly advantageous when VPSs that have isolated components are used, such that when the VPS is operating, files of that VPS may be created or modified to increase memory usage. Some files of different VPSs may coincident, and hardware resources can be conserved by operating with a single copy of those coincident files. The approach described herein is applicable to VPSs (or, more generally, virtual environments) with fully isolated components, to VPSs with shared components, and to a combination thereof.

In one embodiment of the VPS, the operating system creates a data structure that stores the information corresponding to the VPS, which usually occurs when the VPS itself is created. Some of the information can be stored permanently. For example, in the file system there can be a configuration file for each VPS. The data structure also typically includes a number of parameters used for the functioning of the VPS itself. Preferably, there is a quick way of naming the VPSs, such that searching through the data structure can be accomplished rapidly. This can be a VPS ID, which can be, for example, a number, an alphanumeric string, or similar constructs. Those objects that are unambiguously identified as being associated with a particular VPS typically cannot be re-associated with another VPS, since such a possibility usually suggests a concurrent possibility of a security hole. In other words, a process that is "born" in the context of one VPS cannot live in another VPS.

The launch of multiple VPSs in the same host permits a high level of hardware server utilization. With effective VPS resource isolation, it is possible to offer a guaranteed level of security and resource availability specified in a service level agreement (SLA).

Thus, a typical application includes a physical computing system or stand-alone computer (usually called a "host") that is configured to run multiple isolated Virtual Private Servers (VPSs). The host includes an operating system (OS) kernel. The kernel runs a number of processes and threads for execution of various system-related activities. The host also includes a number of processes running on the hardware server that correspond to the VPSs, with typically (but not necessarily) at least one user connected to at least one VPS.

The host can include a physical memory, such as a dynamic random access memory (RAM) used by the various processes and threads. The hardware system can also include various storage elements, such as caches, and operating system buffers. The computer system also includes a central processing unit (CPU), or optionally multiple CPUs, whose time can be shared between and among the VPSs. A number of peripheral devices can be included, such as disk storage devices, input/output interfaces, network interfaces, etc. The storage mechanisms, particularly disk storage, can include data files, databases, metadata storage and various other permanently and temporarily stored data objects.

Generally, as used in this description, the operating system kernel has one or more "processes" running within the kernel mode. The operating system itself may be viewed as a process. The OS process has its own objects for its own internal use, as well as a number of objects that are representative of the VPSs supported within it.

Each VPS is therefore a set of processes running in user mode and having support from the operating system kernel. Each such VPS typically has a number of OS users and groups, with objects representative of the users associated with the particular VPS. Also, each VPS typically has a number of processes and threads that correspond to, for example, application software being run by a particular OS user.

Each VPS can have its own identifier that allows someone, e.g., an administrator, to locate the VPS via a network interface. The VPS also includes a number of interfaces that permit the users, including the VPS administrator, to access the various services available on the server and on the kernel. A particular case of such services is remote control, sometimes referred to as "server configuration means." Such interfaces include system calls, shared memory interfaces, I/O driver control (ioctls), and similar mechanisms. Each VPS therefore usually has an address, e.g., host name or IP address, which can be used by a user to establish connections with processes associated with a certain VPS. Each VPS typically includes a number of processes, threads, lightweight processes, and other primitives for servicing the users of that particular VPS. Each VPS also typically has its own objects and data structures that are associated with the processes and threads of that particular VPS. Each VPS may also include a number of objects and data structures utilized by the operating system for control of that VPS.

Normally, the VPSs communicate with the outside world using I/O ports of the computer, which are connected to some sort of network, such as the Internet, a LAN, a WAN, etc. Each such VPS is associated with an IP address, as noted above, which the outside world uses to access that particular VPS.

It should be noted that in the general case, VPS processes are fully isolated from each other and cannot affect another VPS's process, although in some cases, a single VPS can support other VPS's within it. Also, the level of isolation between VPSs can be reduced by the host OS or by additional settings.

The VPSs can also be implemented as a software expansion of capabilities of Windows-based servers (i.e., "add-ons"), for example, Microsoft Windows NT servers, Microsoft Windows 2000 servers, Microsoft Windows Server 2003, and various derivatives thereof, by adding the missing isolation mechanisms and VPS resource management mechanisms to the operating system kernels of those operating systems.

Each VPS offers a number of services to users of that VPS, which are implemented as processes within that VPS. From the perspective of the user, the existence of the VPS is transparent, such that to the user it appears that he has an entire remote server dedicated to himself. The present invention provides the possibility to enable some VPS functions even if the VPS itself is inoperable or appears unreachable to the user.

FIG. 1 illustrates an example of a physical hardware server 102 that is running multiple VPSs, sometimes also called virtual environments. As shown in FIG. 1, a hardware server 102 is typically connected over the Internet to a number of users. A number of VPSs are running within the server 102, such that each VPS, to its corresponding user, appears to be an entire fully functional computer or server. In other words, the user normally is unaware that he is only getting a fraction of the resources of the server 102 to which he connects.

As further shown in FIG. 1, the VPSs can be either general purpose servers, or special purpose, or dedicated servers. For example, the VPSs can be web server, designed to deliver web pages to anonymous users upon request. The VPSs can be database servers, FTP servers, or mail servers. The VPSs can also be application servers, for example, those that interface with users in the context of games, or various other types of applications. Note that each VPS can itself connect to either a single or multiple users, including an unlimited number of users (for example, in the case of a web server, which can be designed to respond to anonymous requests for web pages. Other VPSs can require various forms of user identification and authentication, for example, mail servers or FTP servers. Each server typically has its own control panel, and various administrative rights granted to one or more users.

The present approach takes advantage of the fact that most of the thousands of VPS files are common (and often identical) for all the VPSs running on a particular physical computer. That is, on a physical computer or hardware server running several hundred or several thousand VPSs, with each VPS having several thousand files in its "private" area; most of these files are identical across the VPSs. Although occasionally a situation might arise where an administrator of that VPS (in other words, from the perspective of the operating system running on the physical server, a user), might want to modify the VPS files, this is a relatively rare situation. It is somewhat analogous to the ability of a user of a desktop to modify the files of the operating system running on that desktop—for example, Windows, LINUX, etc. Although the desktop user has that ability, very few people, in fact, take advantage of it. Similarly, in the context of the VPS, each VPSs administrator has the ability to change the files (including all the files) of that VPS, but very rarely does so.

Most VPSs are launched in order to run some application, for example, a webserver, a game server, etc. Thus, to the extent that files are modified (if any), they are user files (i.e., application files), and not "VPS" files per se.

Accordingly, in view of the above empirical observation, it is unnecessary for each VPS to have its own physical copy of each file. In other words, it is unnecessary for each VPSs disk partition to contain all the contents of all the VPS files—the vast majority of these VPS files are identical, and only a single copy needs to be maintained somewhere. Rather than having a copy of the actual files I the VPSs' private areas, these files can be replaced with links to a template, or shared, area. The template area will contain the "master," or unaltered, files, with the links in each VPSs private are pointing to those "master" files.

The present invention therefore enables a dramatic reduction in the amount of disk space that needs to be allocated to each VPS. Since, for the vast majority of the VPSs, most files will be in common and identical across the VPSs, only a single shared template area containing a single "master" copy of the VPS files needs to be maintained, freeing up the disk space and RAM otherwise allocated to the VPSs own administrative needs for user applications.

Accordingly, a system and method is contemplated for replacing identical files in each VPSs private area with links to a "master" (template, or shared) area containing a "master" copy of the files. The software to perform this task can be treated as a system utility. This process can be performed with respect to VPSs that have already been launched, or it can be performed prior to the launching of the VPS, at the time of the VPS creation, where the files are replaced with the appropriate links prior to the startup of the VPS.

Figure 2A:
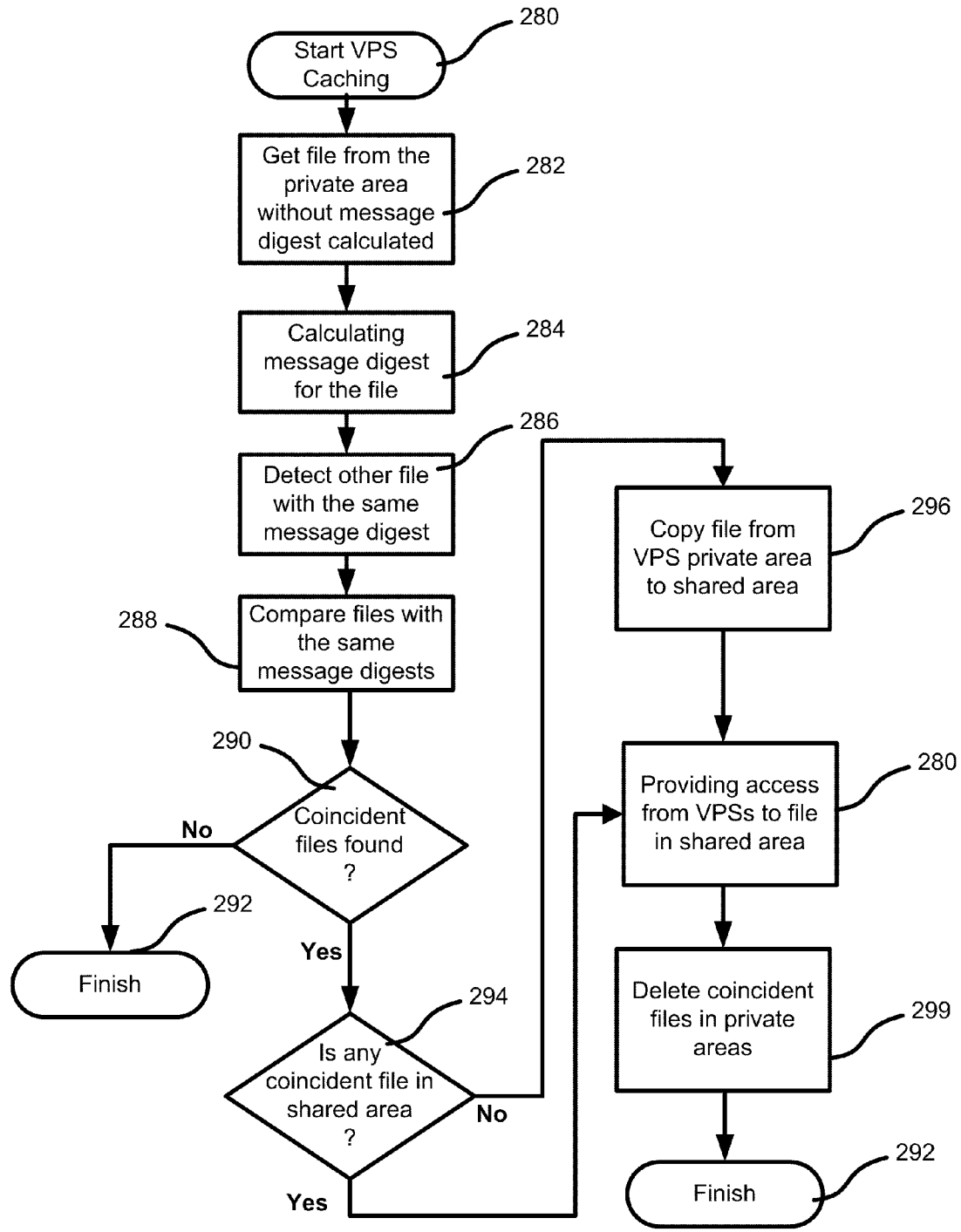
FIG. 2 illustrates processes of memory reallocation in one embodiment of the invention.

FIG. 2A illustrates one aspect of the utility's operation. As shown in FIG. 2A, when the VPS caching process starts in step 280, the utility gets the file from a private area of the VPS without a previously calculated message digest (step 282). A number of methods can be used to verify the identity of the files being replaced to the master copy of the file. One method is comparing check sums. Another method is bitwise comparison of file contents.

Another method involves calculating hash function values of the files, and then comparing files with identical hashes. An algorithm that transforms a string of characters into a usually shorter value of a fixed length or a key that represents the original value. This is called the hash value. Hash functions are employed in symmetric and asymmetric encryption systems and are used to calculate a fingerprint/imprint of a message or document. When hashing a file, the file is converted into a short bit string—a hash value—and it impossible to re-establish the original file from the hash value. A hash value is unique in the sense that two different files cannot result in the same bit string.

The "message digest", as used in this context, is a concept known in cryptography. The message digest is usually some small identifier related to the file, such as a hash function value, an electronic signature, a checksum, etc. The important point is that the message digest is unique for each file with unique contents, and, files with different contents cannot have the same message digest.

The message digest is then calculated (step 284), and the utility then identifies other files that have the same message digest (step 286). By definition, files that have the same message digest have identical contents. The utility then compares files with the same message digest (step 288). If no such files have been found (step 290), the process terminates in step 292. If such files have been found, then, in step 294, the utility checks whether there are any coincident files in the shared area. If not, then the file is copied from the VPSs private area to the shared area (step 296). The copying process can be preferably implemented as copying file to another partition, e.g., to a special shared partition, or by preserving physical blocks of the file in the same location, but using links or pointers for accessing file in the VPS, where the file was previously accessed directly. Indeed, in the latter case, the file should be copied to the local area of the VPS when that VPS tries to modify the file. The VPS is then given access to that file through a link or a pointer (step 298). In step 294, if the file is already in the shared area, then step 296 need not be performed.

The utility can then delete the file in the VPSs private area (step 299), and the process terminates (step 292).

Figure 2B:
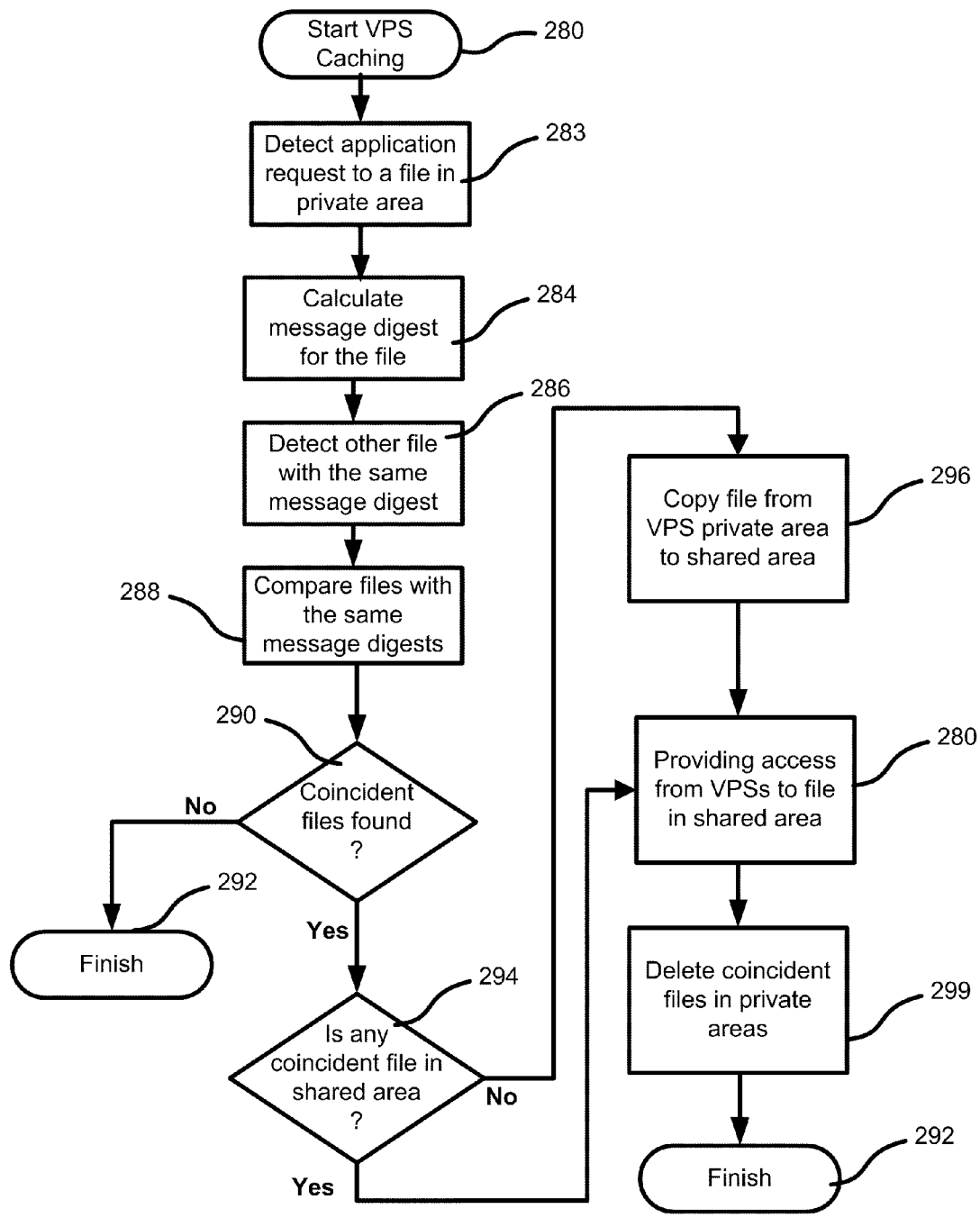

FIG. 2B illustrates another embodiment of the invention. As shown in FIG. 2B, the process of VPS caching starts in step 280. An application request to access or request a file from a private area is then detected in step 283. In step 284, a message digest for the file is calculated.

In step 286, other files that have the same message digest are identified. The files are then compared in step 288. Note that the digest is shorter than the original, and depending on which algorithm is used to calculate the digest, there is a possibility that different original files can have the same digest. In step 290, if no coincident files are found, the process terminates in step 292. If coincident files (i.e., files with the same message digests) are found, the utility checks whether such a file also exists in the shared area. (Step 294). If no such file exists, then, in step 296, the file is copied from the VPS's private area to the shared area. The VPS is then provided access to that file in the shared area, through a link or a pointer (step 298).

In step 294, if the file with the same message digest is found in the shared area, then the process proceeds directly to step 298. In step 299, the coincident files in the private areas of the VPS can be deleted, and the process terminates in step 292.

Figure 2C:
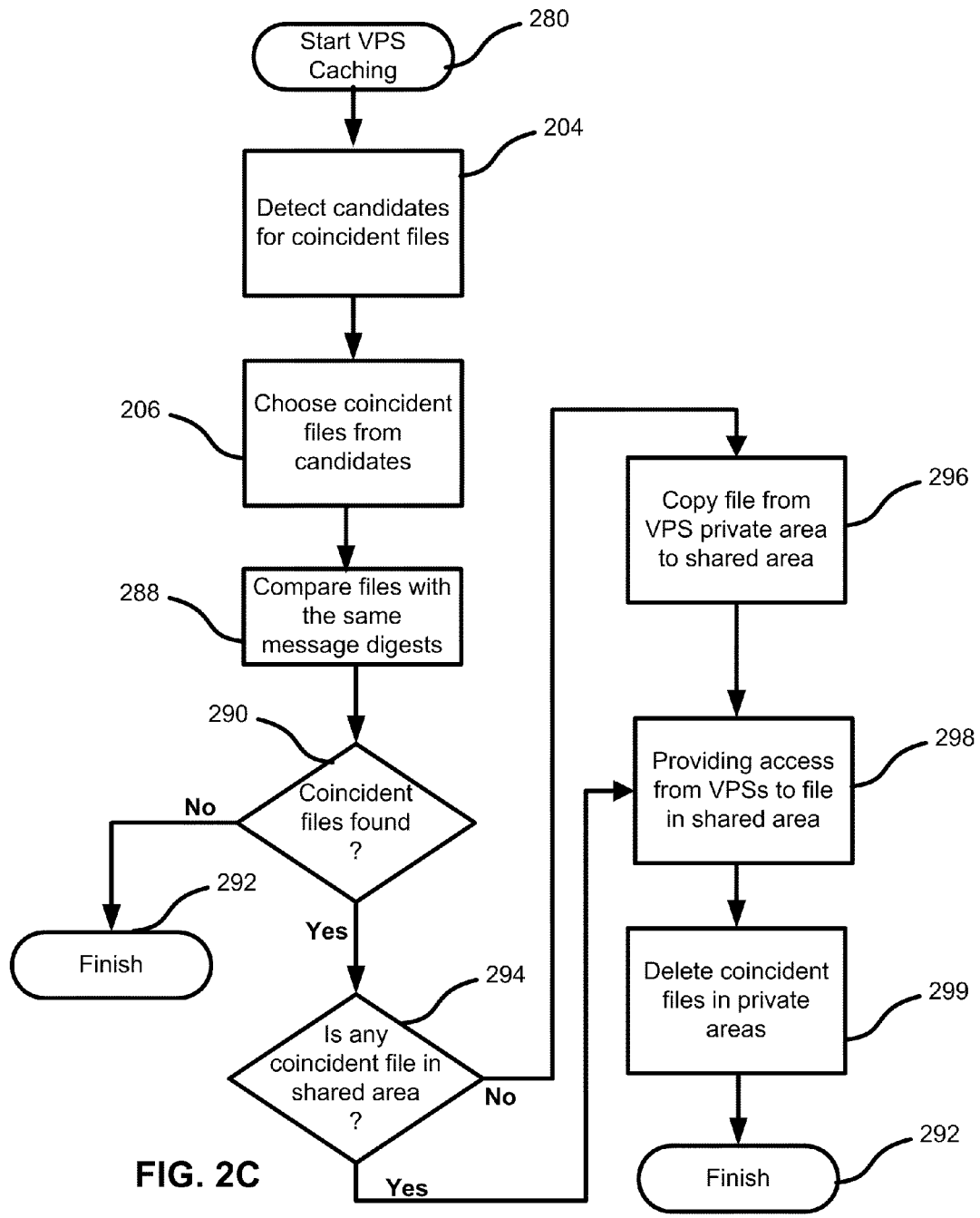

FIG. 2C illustrates another possible aspect of the utility's operation. As shown in FIG. 2C, when the VPS caching process starts in step 280, the utility detects files that are candidates for being placed in the shared area (step 204). For example, template files and files that are user-specific are usually not candidates, while operating system files, drivers, etc. usually are. A set of files is then chosen (selected) (step 206).

The utility then compares the files based on their message digests (step 288), and, if no such files exist, the process terminates in step 292. If such files have been found, then, in step 294, the utility checks whether there are any coincident files in the shared area. If not, then the file is copied from the VPSs private area to the shared area (step 296). The VPS is then given access to that file through a link or a pointer (step 298). In step 294, if the file is already in the shared area, then step 296 need not be performed.

The utility can then delete the file in the VPSs private area (step 299), and the process terminates (step 292). Note that in FIG. 2C, instead of having the Yes/No branches from step 294, a command line defined by a user can specify which type of checking can be performed. For example, the user can check for common files, or can create new shared files, or can manually check for files that already exist in the shared area.

Figure 3:
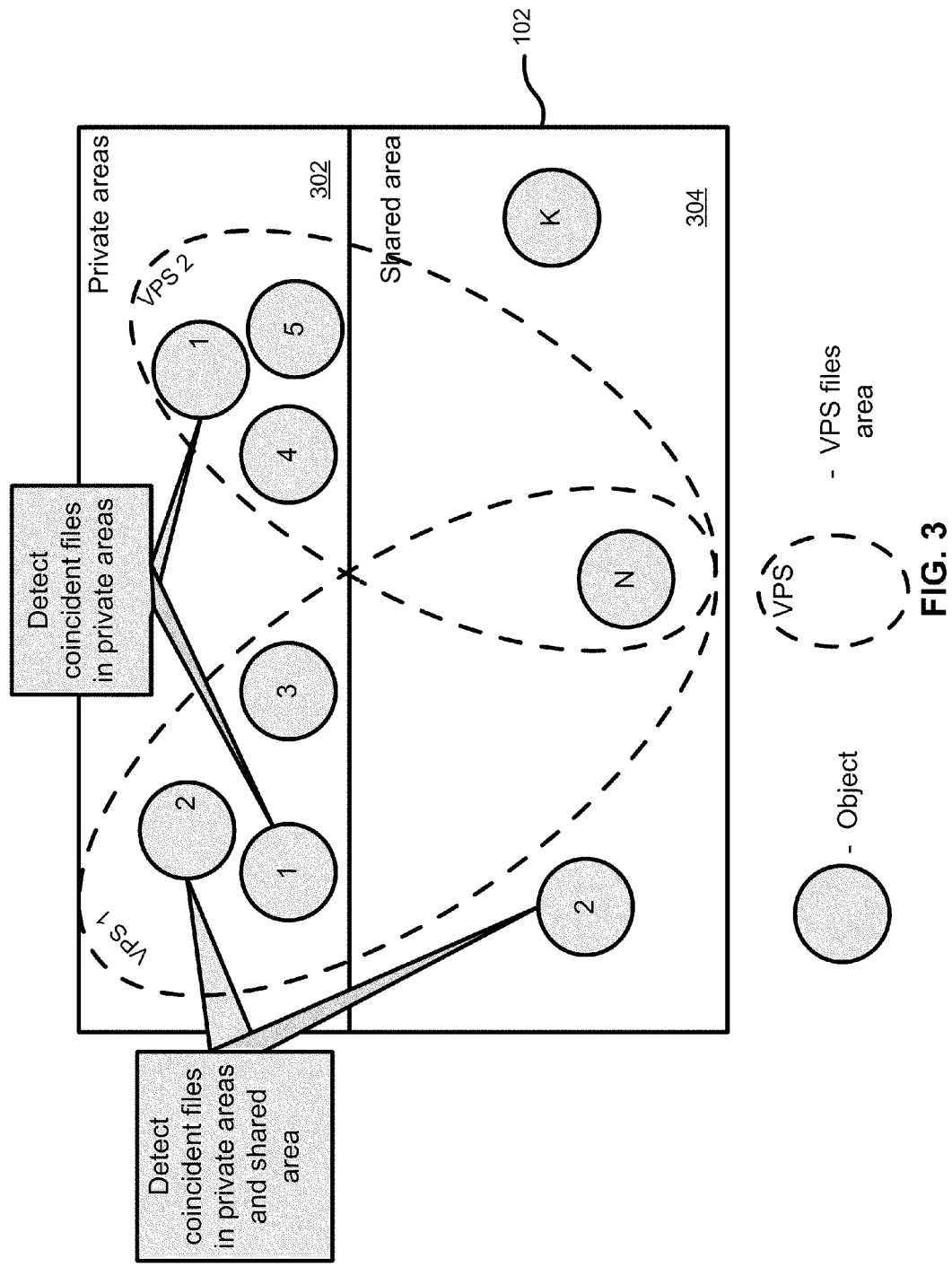
FIGS. 3-5 illustrate utmost and intermediate states of two VPSs during realization of the invention.

FIG. 3 illustrates, in block diagram form, the relationship of the various entities involved in the operation of the utility. As shown in FIG. 3, the utility typically works with objects. These objects may be files, directories, or other named objects that the VPSs themselves work with. The most common case is for the object at issue are files.

Further, as shown in FIG. 3, the hardware server 102 has private areas 302 corresponding to the particular VPSs, and a shared area 304. The numbered circles in the figure represent files, where, for example, file number 1 is identical between VPS1 and VPS2. File number 2 is found only in the private area of VPS1 and a copy already exists in the shared area 304. File K exists in the shared area but is not used by either of the two VPSs. File N is already in the shared area 304 and is already shared by both VPSs 1 and 2, through pointers that point to that file.

Figure 4:
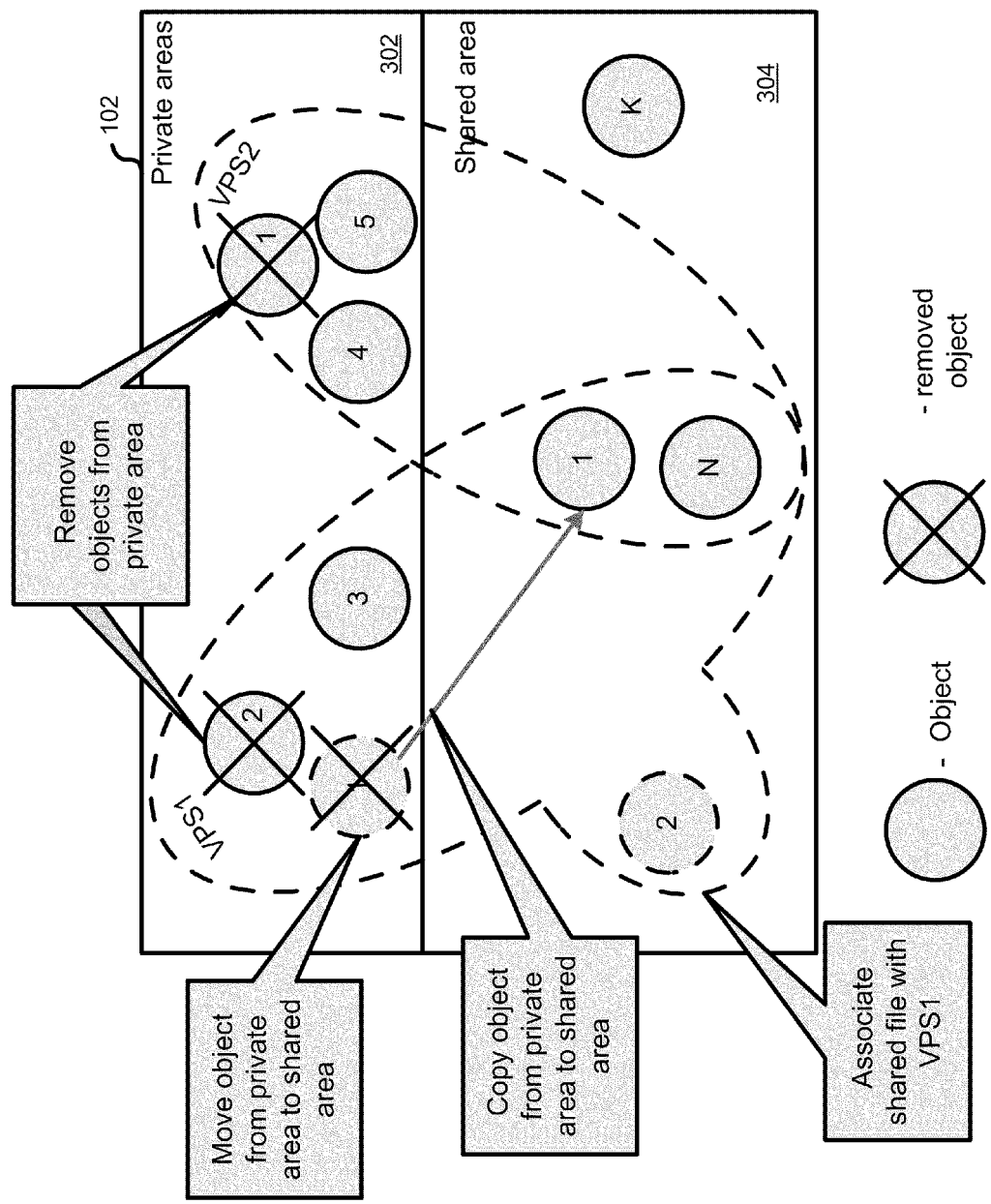

FIG. 4 illustrates the next stage in the operation of the utility. Note that file 1 has been copied to the shared area 304, and deleted from the private areas of the VPSs. File 2 has been deleted from the private area of VPS one, since it exists already in the shared area, 304, and VPS1 has been gra[n]ted access to file 2 in the shared area.

Figure 5:
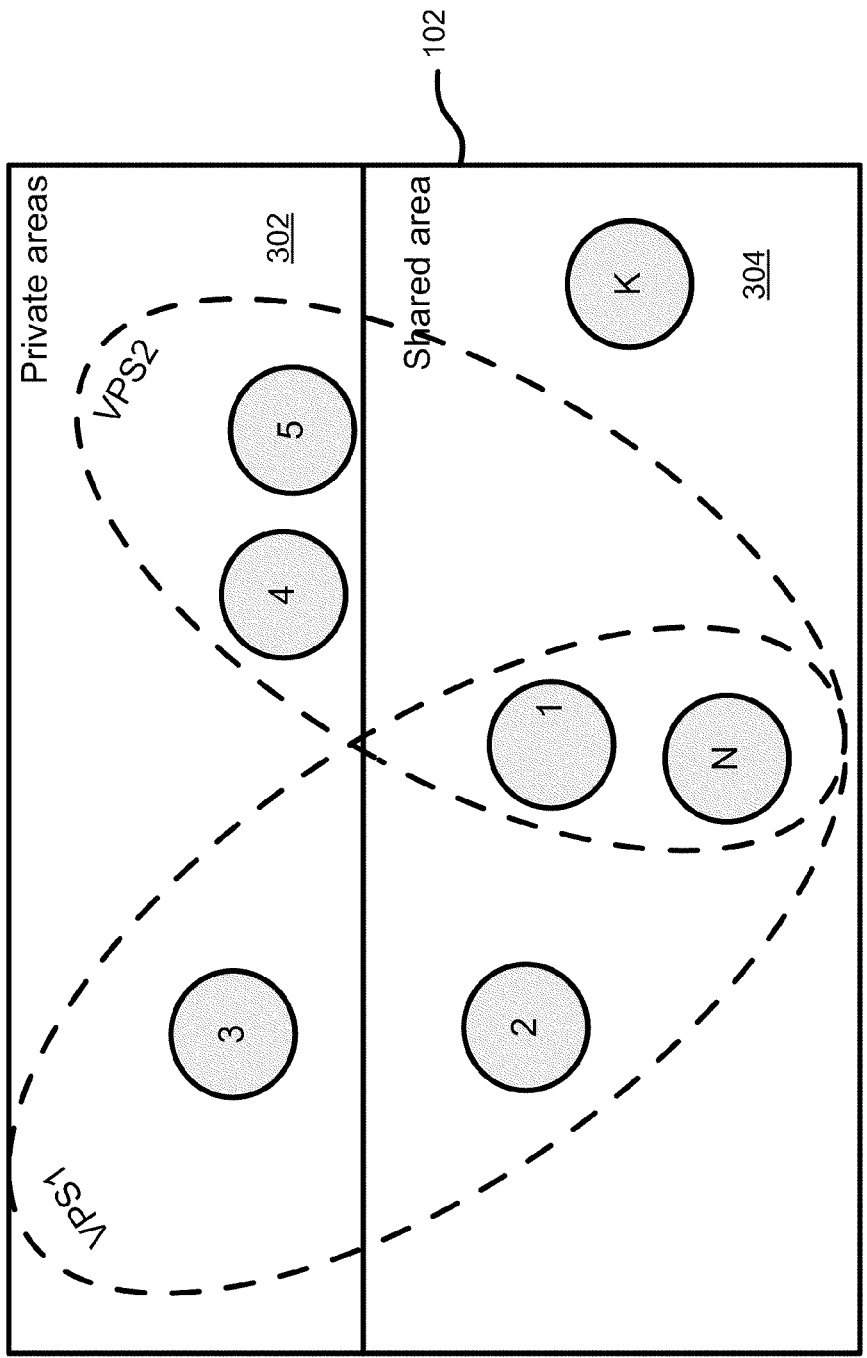

FIG. 5 illustrates the state of the system after all the operations have been performed. Note that file 1 is now shared by both VPSs, file 2 is only accessed by VPS1. Files 3, 4 and 5 remain in the private areas 302. This may be, for example, due to the fact that these files are either user specific, or may be system files that have been changed or edited somehow by the VPS itself, and are therefore not good candidates for being shared. Note also that whatever memory or disk space was previously occupied by files 1 and 2 in the private areas of the VPSs is no longer taken up by them.

Figure 6:
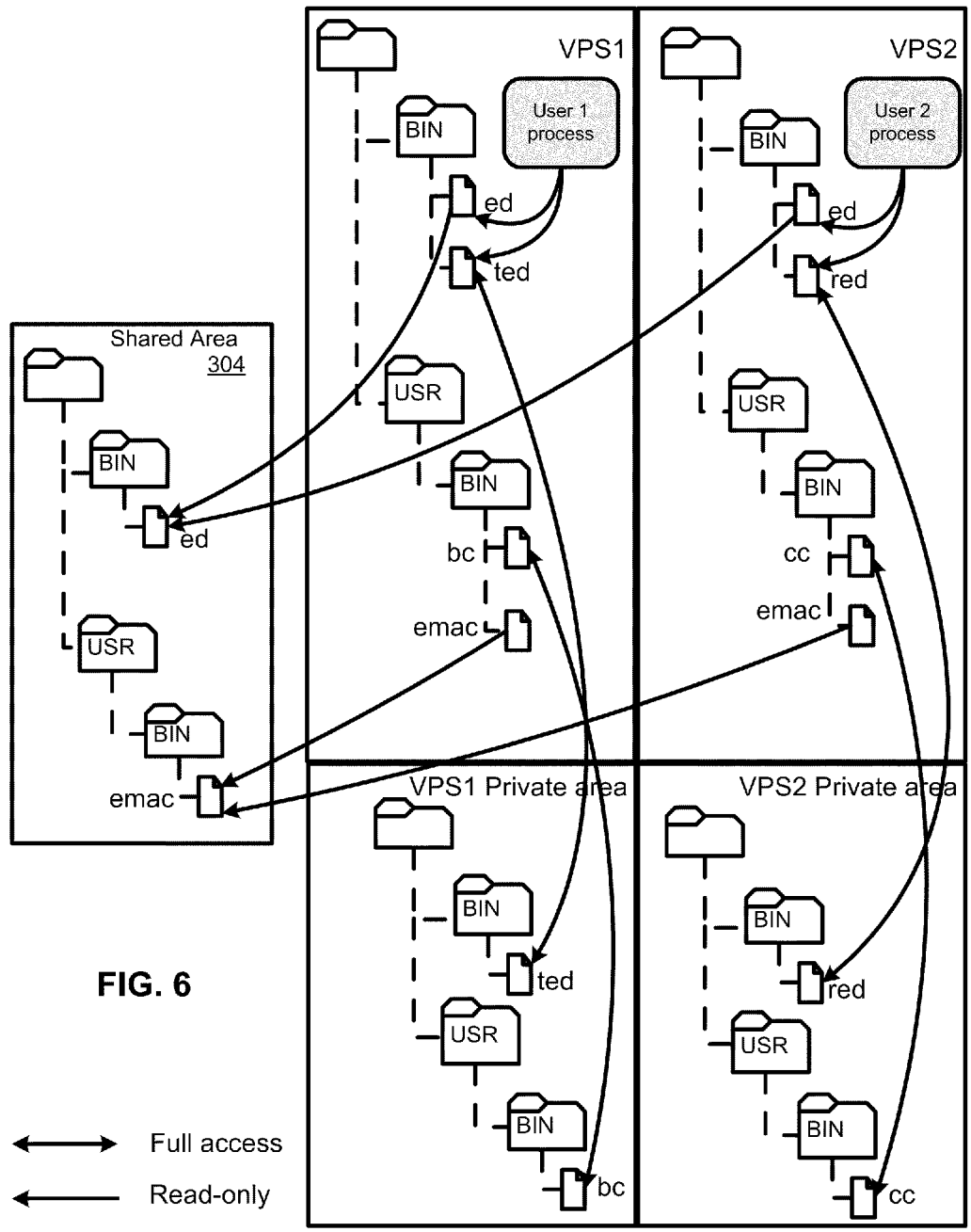
FIG. 6 is a diagram showing how links are used to access shared files.

FIG. 6 illustrates the operation of the utility from a directory perspective. As shown in FIG. 6, the shared area 304 includes a directory. Also, each VPS includes a directory for the common area, and a directory for that VPSs private area. The links (arrows in the figure) represent pointers to the files on the disk or other storage media. For example, as shown in this figure, a user 1 process accesses files ed and file ted. These files, in fact, are physically located in the shared area, and all that is located in the VPSs directory and memory are pointers. Similarly, user 2 process in VPS2 accesses the file ed in that VPSs directory, but that file is also linked to the file ed in the shared area 304. Thus, multiple VPSs can access a single file, and memory usage can be reduced.

In one embodiment hash functions are calculated while the user applications attempt to access or modify the file. Alternatively, all files without hashing are periodically checked and hash functions for files in private area are periodically formed.

Figure 7:
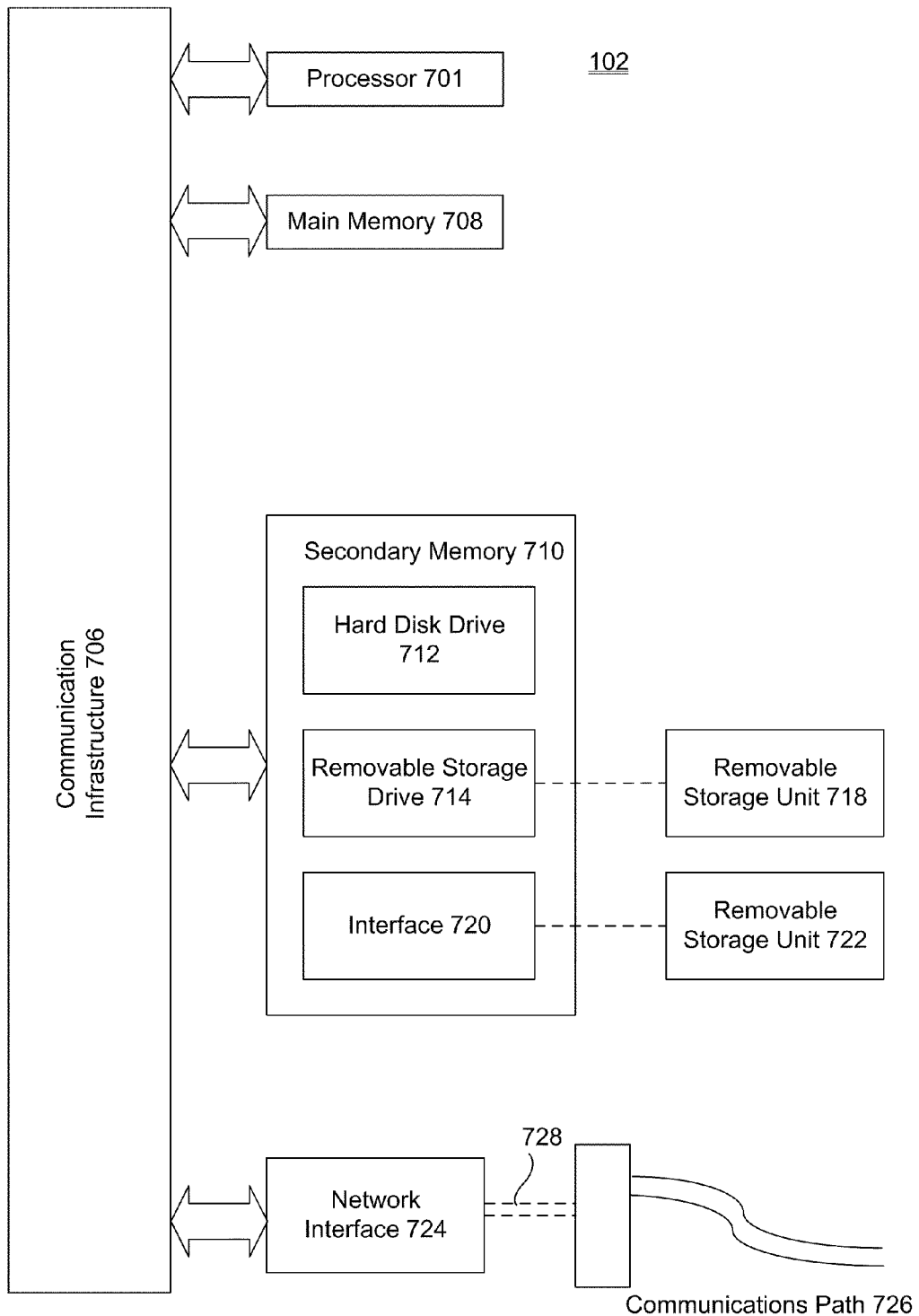
FIG. 7 is a schematic diagram of an exemplary computer or server that may be used in the invention.

An example of the computing system 102 is illustrated in FIG. 7. The computing system 102 includes one or more processors, such as processor 701. The processor 701 is connected to a communication infrastructure 706, such as a bus or network. Various software implementations are described in terms of this exemplary computer system. After reading this description, it will become apparent to a person skilled in the relevant art how to implement the invention using other computer systems and/or computer architectures.

Computing system 102 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718 represents a magnetic tape, optical disk, or other storage medium that is READ by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into computing system 102. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to computing system 102.

Computing system 102 may also include one or more communications interfaces, such as communications interface 724. Communications interface 724 allows software and data to be transferred between computing system 102 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 701. Information representing processed packets can also be sent in the form of signals 728 from processor 701 through communications path 726.

The terms "computer program medium" and "computer usable medium" are used to generally refer to media such as removable storage units 718 and 722, a hard disk installed in hard disk drive 712, and signals 728, which provide software to the computing system 102.

Computer programs are stored in main memory 708 and/or secondary memory 710. Computer programs may also be received via communications interface 724. Such computer programs, when executed, enable the computing system 102 to implement the present invention as discussed herein. In particular, the computer programs, when executed, enable the processor 701 to implement the present invention. Where the invention is implemented using software, the software may be stored in a computer program product and loaded into computing system 102 using removable storage drive 714, hard drive 712 or communications interface 724.

The process of replacing a file with a link needs to check whether that file is being used at the moment (if it is, that could mean that the user of that VPS is attempting to modify it). Note also that the process of replacing identical files with links to a master copy can be done as a background process.

Note also that the approached described herein can also be applied to a situation where there exists a finite number of versions of "the same" file. For example, some VPSs might have a security patch installed already, and others might not. In this case, there can be two different versions of the same file (or, more likely, two different versions of a group of files that is subject to the security patch). Thus, it is possible to have more than one version of the same file in the master template area, with the link in the VPSs private area pointing to the appropriate file, depending on whether or not it has been patched, or upgraded (or not).

With regard to the upgrades, it is possible that some users of "the same" application, such as a game, might have upgraded to a new version, and others have not. This may be due either to inattention, inertia, cost considerations, etc. In this case, similarly, the links in the VPSs private areas can point to one of several files that represent the "correct" file for that particular VPS.

Note also that similar to having only a single copy of the file on the disk drive, the same concept applies to random access memory (which is frequently the more expensive component in many server VPS applications). Just as only a single copy of identical files needs to be kept in a master template area (with the other copies replaced by links), similarly, each VPSs is allocated a portion of random access memory, with many of its files that are necessary for execution loaded into memory. Thus, instead of the files, the memory can be loaded with pointers (analogous to links) to one copy of the file that is loaded in some protected area of memory.

It should also be noted that the present approach is compatible with reducing user application file space as well, to the extent that many of the launched VPSs on the same computer share the same user application files. This is frequently the case in such applications as online multi-player games, where a single VPS may be limited to a particular number of players (for example, for bandwidth reasons, server load reasons, or due to any other reason).

However, many such VPSs could be running on the same physical machine, each VPS dedicated to servicing some subset of the players, but each VPS running the same game. Note that in the context of games (and many other applications), the vast majority of the files are not used at any given time, and almost never modified—for example, system utilities, drivers, image and video files used to generate a game environment, etc. This provides similar opportunities for creating a single "master" template area, where only one copy of the file needs to be stored, and links to that copy provided in the VPSs private disk area. Obviously, if a user, or a VPS administrator, decides to change or modify a particular file in some fashion, then a copy of that modified file would be created in the VPSs private area, and the link can point to that modified copy, rather than to the master copy.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for managing files of virtual servers, the method comprising:
    launching a plurality of virtual servers in a single computing system having a single host operating system and under control of the host operating system;
    copying a content of a private file of a first virtual server to a shared space;
    retrieving private files of other virtual servers and detecting private files with identical content as the file copy of another virtual server;
    providing access to the detected files in the shared space to the other virtual servers when they attempt to access their corresponding private files by using a link to the file copy in the shared space that is recognized by a file system of the other virtual servers; and
    wherein the shared space and the private files are located on the same computing system.

2. The method of claim 1, further comprising, after detecting the private file with identical contents in another virtual server, copying, to the shared space, contents of a private file of that virtual server, wherein the private file is being accessed.

3. The method of claim 1, wherein the detected private file is chosen from files in a private area of the virtual server.

4. The method of claim 3, further comprising:
calculating a message digest for files of the virtual servers, wherein the detecting step detects files with the same contents based on having identical message digests; and
selecting at least one file from the files with same message digests for the copying step.

5. The method of claim 1, wherein the file copy in the shared space is read-only.

6. The method of claim 1, wherein the access is provided by generating shareable file tree in the shared area, and a private file tree in the virtual server private area, wherein the private file tree uses links to the shareable file tree files.

7. The method of claim 1, wherein access to the file in the shared space is provided by creating a stub file to replace the original file, wherein the stub file identifies the file in the shared area.

8. The method of claim 1, wherein processes of different virtual servers are isolated from each other.

9. The method of claim 1, wherein files in the shared area are accessed from different virtual servers using different views of a common file system tree.

10. The method of claim 1, wherein the private files of each virtual server are stored on a disk partition allocated to that virtual server.

11. The method of claim 1, wherein the detecting step comprises any of bit-wise comparison of the files, comparison of checksums of the files, comparison of digital signatures of the files, and comparison of hash values of the files.

12. The method of claim 1, wherein the file replacing is performed as a background process.

13. The method of claim 1, wherein comparison is performed while attempt of requesting the file in the private area.

14. A system for managing files in a server environment, the system comprising:
a processor;
a memory coupled to the processor;
computer code loaded into the memory for implementing the method of claim 1.

15. A computer program product for managing files in a server environment, the computer program product comprising a computer useable non-transitory storage medium having computer program logic stored thereon for executing on at least one processor, the computer program logic implementing the method of claim 1.

* * * * *